Patented Nov. 10, 1953

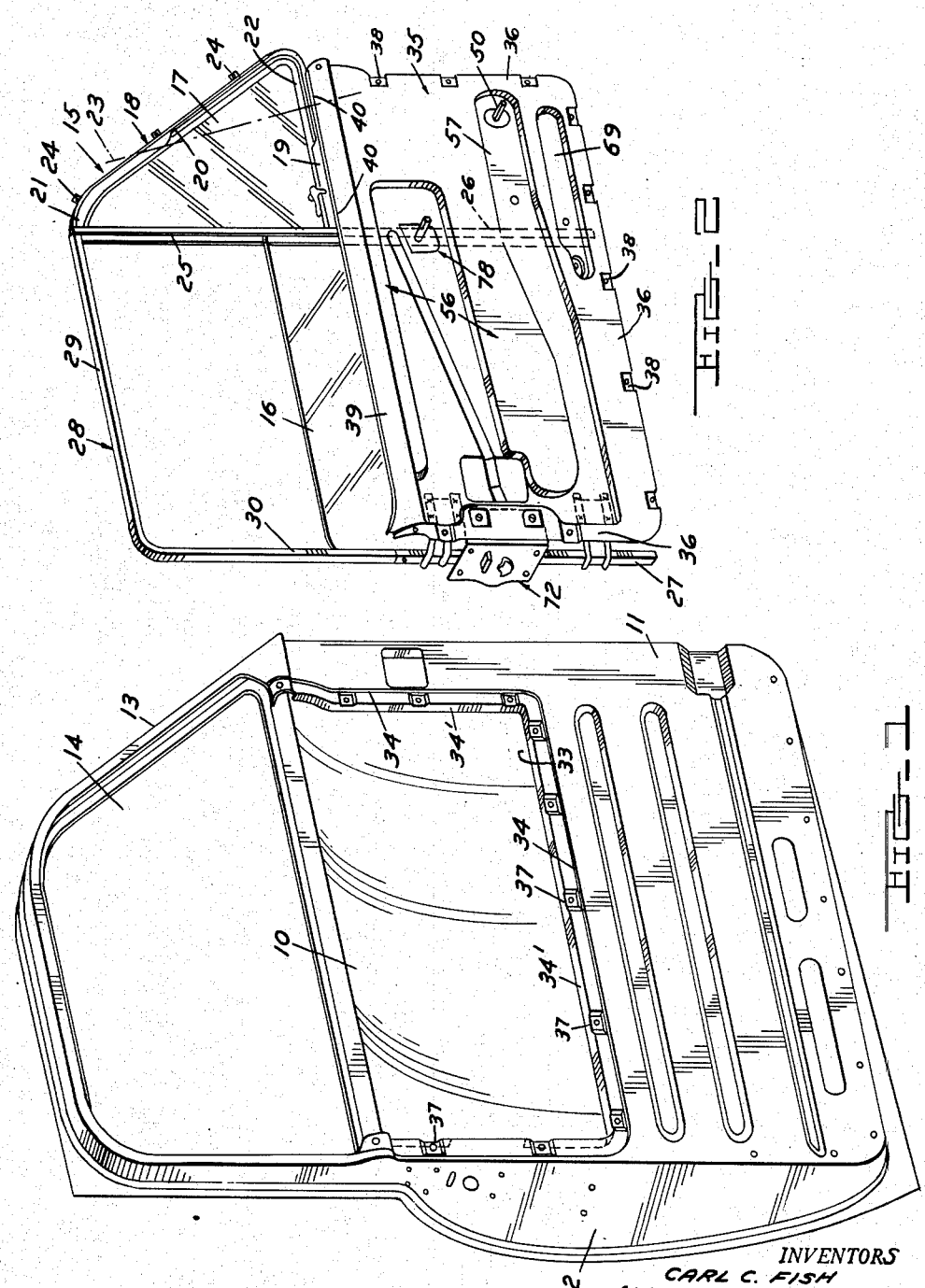

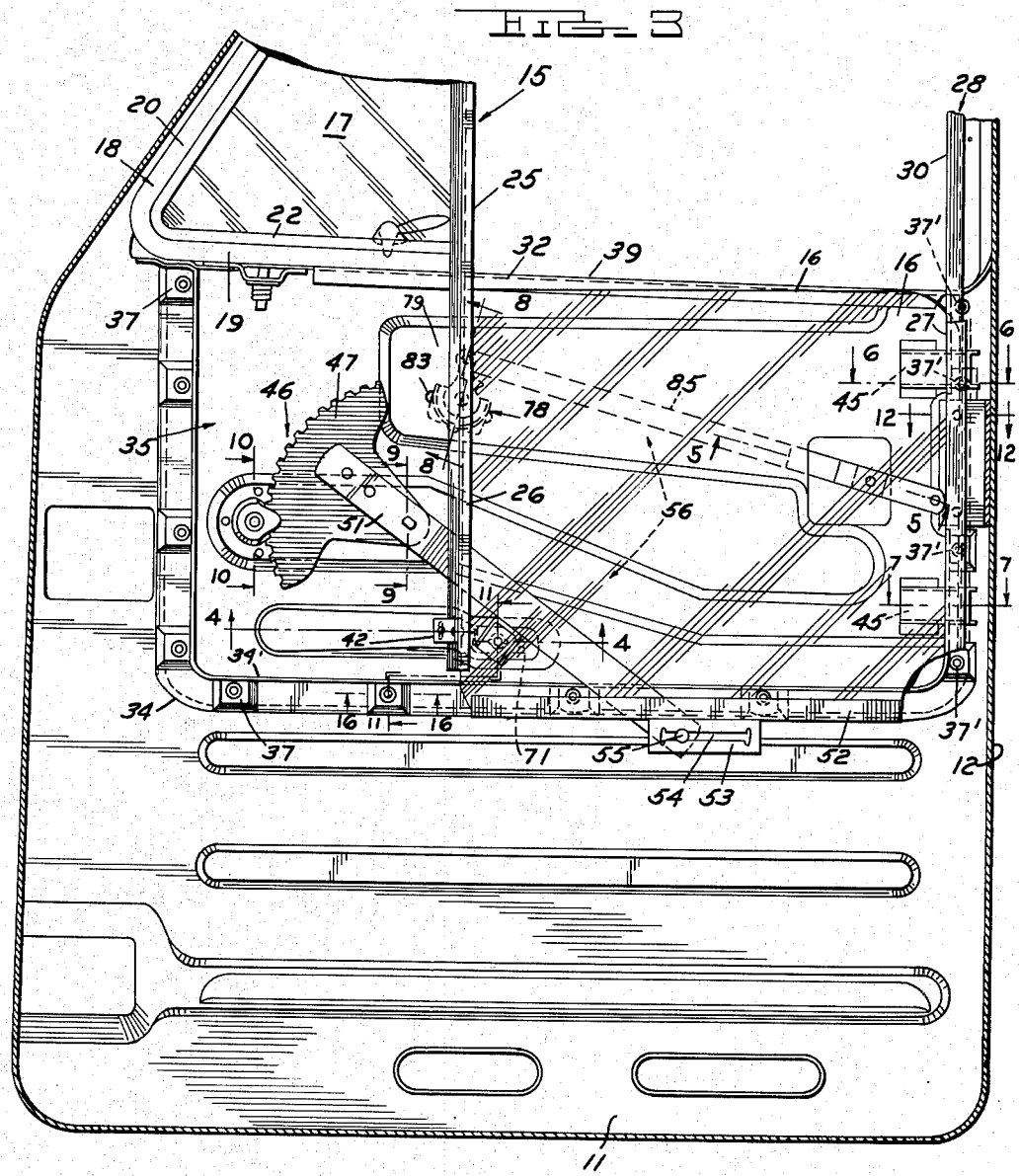

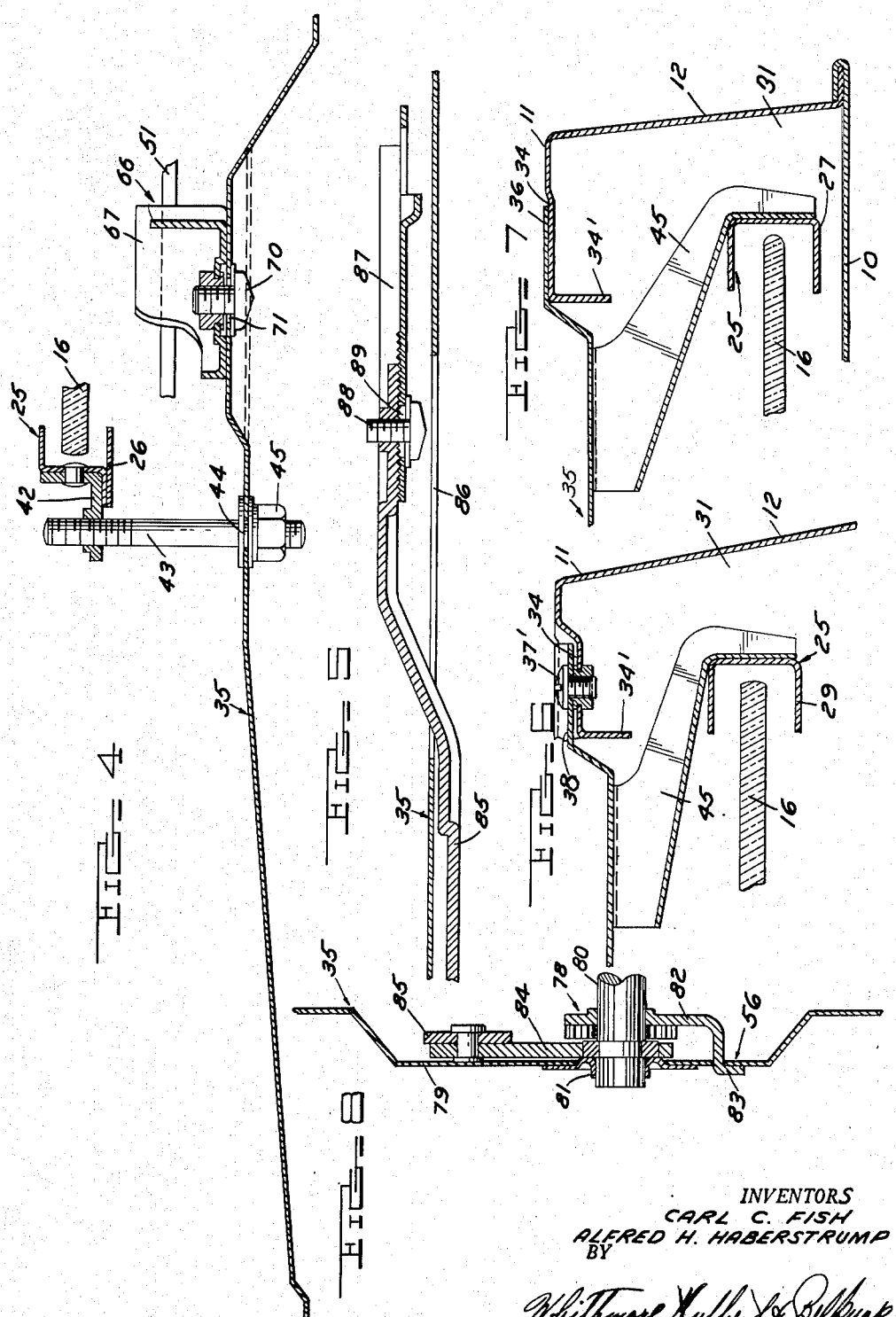

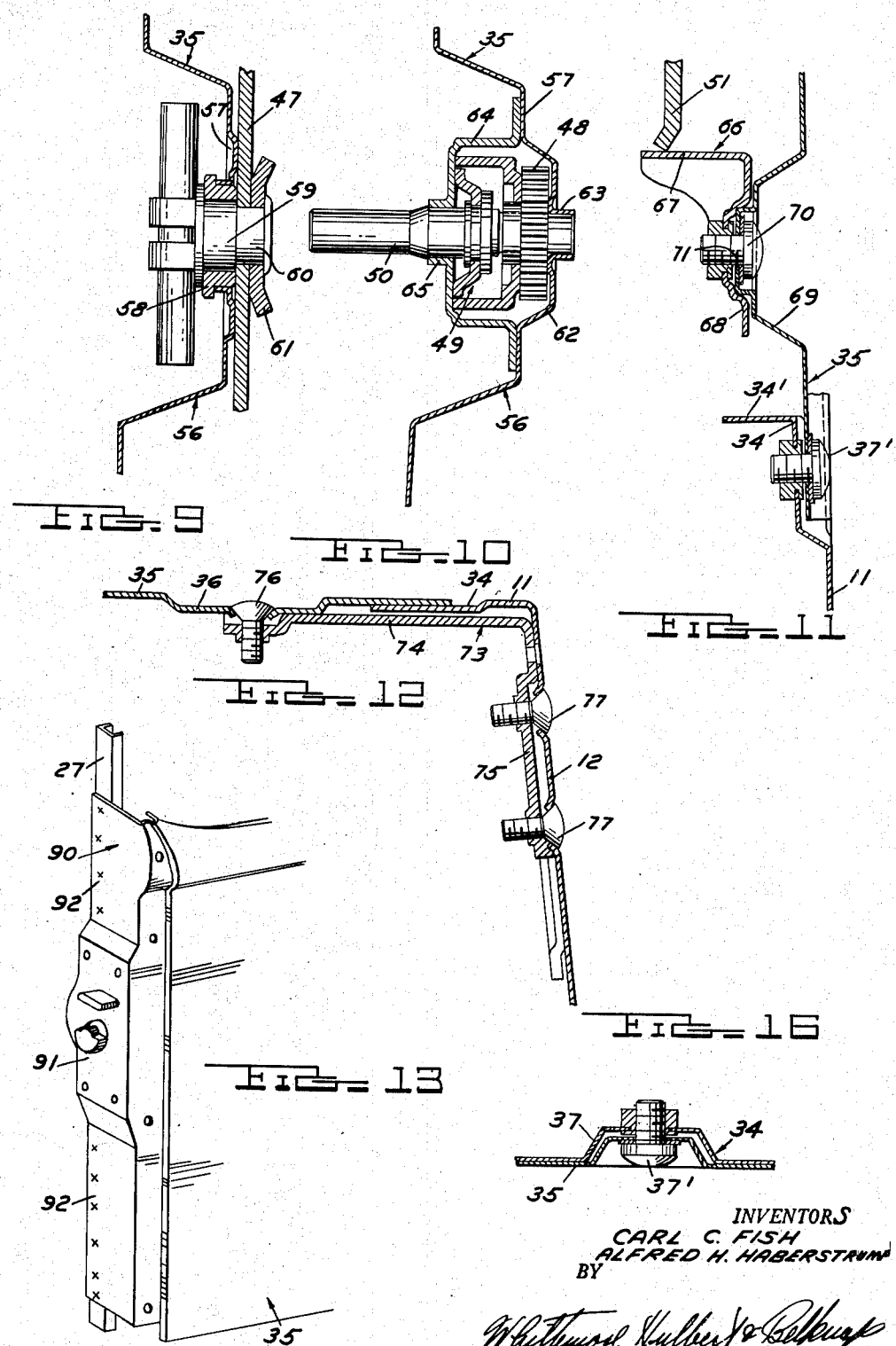

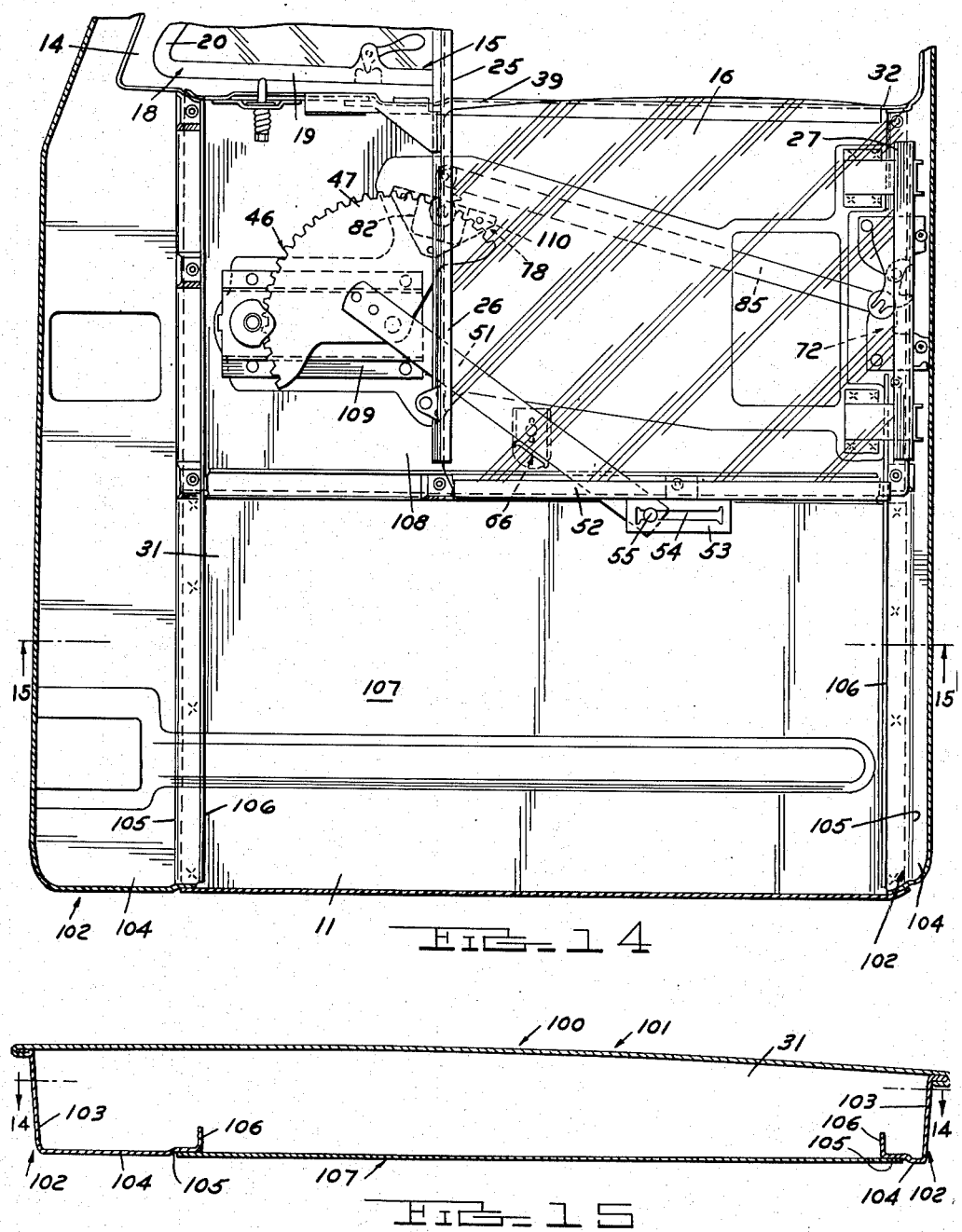

2,658,790

UNITED STATES PATENT OFFICE 2,658,790

VEHICLE DOOR CONSTRUCTION

Carl C. Fish and Alfred H. Haberstrump, Detroit, Mich., assignors to Ferro Stamping Company, a corporation of Michigan Application February 19, 1951, Serial No. 211,645

14 Claims. (Cl. 296—44)

This invention relates to door structures, and refers more particularly to an improved swinging door of the type employed on vehicle bodies.

It is one of the objects of this invention to simplify assembly of the door by providing a construction wherein various accessories or separate parts may be installed as a unit on the door structure.

In accordance with this invention the inner panel of the door is cut away; or in other words, has an opening therethrough below the window ledge and in registration with the well provided for receiving the usual vertically slidable window panel. The opening aforesaid is normally closed by a removable plate which is fashioned to support a number of separate parts of the door assembly. In the present instance one or more of the following parts or accessories may be installed on the closure plate prior to assembling the latter on the door structure. These accessories or door parts are: (1) the door latch assembly; (2) the remote control for the above; (3) the window regulating mechanism; and (4) the window assembly including the vertical guides for the glass panel.

With the above in view, it is a further object of this invention to provide a door structure wherein one or more of the above listed parts are attachable to the closure plate to provide a bench assembly capable of being installed as a unit on the door structure.

The foregoing as well as other objects will be made more apparent as this description proceeds, especially when considered in connection with the accompanying drawings, wherein:

Figure 1 is a perspective view of a part of a door structure embodying the features of this invention;

Figure 2 is a perspective view of the bench assembly or the closure plate for the opening in the inner door panel;

Figure 3 is a sectional view through the door structure showing the closure plate and its associated parts in assembled relationship;

Figures 4, 5, 6, 7, 8, 9, 10, 11 and 12 are respectively sectional views taken on the lines 4—4, 5—5, 6—6, 7—7, 8—8, 9—9, 10—10, 11—11 and 12—12 of Figure 3;

Figure 13 is a perspective view showing a slightly modified form of construction;

Figure 14 illustrates another embodiment of this invention and is a sectional view taken on the line 14—14 of Figure 15;

Figure 15 is a sectional view taken on the line 15—15 of Figure 14; and

Figure 16 is a sectional view taken on the line 16—16 of Figure 3.

The door structure forming the subject matter of this invention is shown in the several figures of the drawings as comprising an outer panel 10, an inner panel 11, and an intermediate section 12, shaped to form the marginal edge of the door. As shown particularly in Figure 7 of the drawings, the portion 12 is formed by a flange turned outwardly from the inner panel 11 and suitably secured to the outside panel 10.

In accordance with conventional practice, the upper portions of the door panels are fashioned to provide a frame 13 which forms a window opening 14, as shown in Figure 1 of the drawings. The window frame portion 13 is adapted to receive a window assembly 15 of the ventilator type having a vertically slidable glass panel 16 and a pivoted glass panel 17.

As shown in Figure 2 of the drawings, the pivoted panel 17 is supported at the front edge of the slidable panel 16 in a frame 18. In general the frame 18 has a bottom bar 19 which is curved upwardly and rearwardly at the front end to respectively form the front frame bar 20 and the top frame bar 21. As is usually the case the glass ventilator panel 17 has a frame 22 secured thereto, and provision is made for pivotally connecting the frame 22 to the frame 18 in a manner to permit swinging movement of the ventilator panel about a substantially vertical axis, indicated in Figure 2 by the numeral 23. Any suitable means, such for example, as lugs 24 may be provided on the front bar 20 of the ventilator frame 18 for attaching the latter to the front side of the door frame portion 13.

The rear side of the ventilator frame 18 is closed by a division bar 25 having a rearwardly opening channel for slidably receiving the front edge of the glass panel 16, and having an extension 26 which projects for a substantial distance below the bottom bar 19 of the frame 18. Thus the division bar 25 forms a vertical guide for the front edge of the glass panel 16. The rear edge of the glass panel 16 is slidably engaged in a forwardly opening channel-shaped guide 27 which is positioned opposite the extension 26 on the bar 25. If desired the upper end of the bar 25 may be connected to the corresponding end of the window guide 27 by an L-shaped frame 28 which is also preferably channel-shaped in cross section to receive adjacent edges of the glass panel 16. As shown in Figure 2 of the drawings the frame 28 has a horizontal part 29 which is secured at its front edge to the upper end of the bar 25, and has a downwardly extending part 30 which is secured to the upper end of the guide 27 to form a continuation of the latter.

When the window assembly 15 is installed in the door frame 13, the extension 26 on the guide bar 25 and the guide 27 project into the space 31 formed between the outer panel 10 and the inner panel 11. This space is commonly known as a window well, and opens into the bottom of the frame 11 through a slot 32 of sufficient width to freely receive the vertically slidable window panel 16.

With the above in view, reference is made more in detail to Figures 1 and 3 of the drawings, wherein the inner panel 11 is shown as cut away below the window opening 14 to provide an opening 33 having a length approximating the width of the inner panel 11. The opening 33 opens into the space or well 31, and also opens into the window opening 14 at the bottom of the latter. The portions 34 of the inner panel surrounding the opening 33 through the inner panel are offset laterally outwardly to form a recess for accommodating adjacent marginal edges of a closure plate 35, and the marginal edges are turned laterally outwardly to provide a reinforcing flange 34'.

As shown in Figures 6 and 7 of the drawings, the front marginal edge of the plate 35 is offset laterally outwardly to provide a flange 36 which seats on the outer surface of the adjacent portion 34 of the inner door panel 11, and serves to reinforce the plate 35. It will further be seen from Figures 1 and 2 of the drawings that the portions 34 of the inner door panel have outwardly embossed portions 37 spaced from each other around the opening 33 and adapted to seat in corresponding embossed portions 38 formed in the marginal edge of the plate 35. The embossed portions 37 and 38 are clamped together by fastener elements 37' having the head portions located within the recesses provided by the embossed portions. These embossed portions also serve to reinforce both the plate 35 and inner door panel 11. Thus the plate 35 may be quickly installed on or removed from the inner panel 11 of the door. It is pointed out at this time that when the plate 35 is installed on the inner panel 11, the top marginal edge 39 of the plate coacts with the bottom side of the window opening 14 in the outer panel 10 to form a window ledge, and to form the slot 32 through which the slidable panel 16 may pass into the well 31.

In the present instance the window assembly 15 is mounted on the plate 35, and is installed on the door as a unit with the plate 35. As shown in Figures 2 and 3 of the drawings, the bottom bar 19 of the ventilator frame 13 is secured to the ledge portion 39 at the upper side of the plate adjacent the front end of the latter. For accomplishing this result, suitable brackets 40 are secured to the base of the bottom bar 19 in spaced relationship lengthwise of the bar, and these brackets are bolted, riveted, welded or otherwise secured to the ledge portion 39 of the plate 35. As previously pointed out the extension 26 on the division bar 25 is of sufficient length to project a substantial distance into the well 31, and it will be noted from Figure 4 of the drawings that the lower end of the extension 26 is secured to the plate 35 by an angle bracket 42 and a bolt 43. One flange of the bracket 42 is fixed to the extension 26, and the other flange has a threaded opening for threadably receiving the outer end of the bolt 43. The inner end of the bolt projects through a vertical slot 44 formed in the plate 35, and is clamped to the plate 35 by a nut 45. The purpose of the slot 44 is to permit limited adjustment of the bracket 42 relative to the extension 26.

The vertical guide 27 adjacent the rear edge of the door is secured adjacent opposite ends to the plate 35 by brackets 45. As shown in Figures 6 and 7 of the drawings, the brackets 45 are secured to the inner side of the plate 35 and project outwardly from the plate 35 into the well 31. The outer ends of the brackets 45 are secured to the base portion of the channel-shaped guide 27. It follows from the above that the window assembly 15 may be readily attached to the plate 35 before this plate is assembled on the inner panel 11 of the door.

In accordance with conventional practice, the vertical window panel 16 is operated by a window regulator mechanism indicated generally in Figure 3 of the drawings by the numeral 46. This mechanism may be any one of a number of types available to the trade, and need not be shown in detail herein. It will suffice to point out that the window regulator mechanism comprises a gear segment 47, a pinion 48 (Figure 10) meshing with the gear segment 47 and suitable clutch mechanism 49 for connecting the operating shaft 50 to the pinion 48. The operating shaft 50 projects inwardly from the plate 35, and is positioned for convenient manipulation from the inner side of the door.

The gear segment 48 is rotatably supported on the plate 35 in a manner to be more fully hereinafter described, and is secured to the front end of an arm 51 having the rear end connected to the bottom edge of the vertically slidable glass panel 16. This connection is indicated in Figure 3 as comprising a glass retaining channel 52 secured to the bottom edge of the panel 16 and a bracket 53 fixed to the channel 52 intermediate the ends of the latter. The bracket 53 has an elongated slot 54, and the rear end of the regulator arm 51 has a pin 55 which slidably engages the slot 54. The arrangement is such that rotation of the operating shaft 50 in opposite directions respectively raises and lowers the vertically slidable glass panel 16.

In orthodox practice the several parts of the window regulator mechanism 46 are usually installed on a mounting plate, which in turn is secured to the inner door panel. In the present instance it is preferred to dispense with this conventional mounting plate, and to assemble the various parts of the window regulator mechanism directly on the closure plate 35, although such a mounting plate may be provided, and in turn fixed to the plate 35 if desired. In accordance with the present embodiment of this invention the closure plate is embossed laterally outwardly as indicated by the reference numeral 56 in Figures 2 and 3 of the drawings. As shown in Figure 9 of the drawings, a portion 57 of the embossment 56 adjacent the front edge of the plate 35 provides a support for the gear segment 47. The portion 57 is apertured and a bushing 58 is secured in the aperture and provides a bearing for a pivot pin 59. The pivot pin 59 has a reduced polygonally shaped part 60 which extends through a corresponding opening in the gear segment, and the latter is secured in place on the pivot pin by a suitable fastener 61.

In Figure 10 of the drawings, it will be noted that the embossed part 62 which provides a recess for the pinion 48, has an opening therethrough fashioned to form a bearing 63 for the outer end of the control shaft 50. It will also be noted from Figure 10 that the clutch 49 is enclosed in a housing 64 secured to the inner side of the embossed portion 57, and fashioned to form a bearing 65 for the inner end portion of the control shaft 50.

In Figure 11 of the drawings, a stop 66 is shown for limiting the extent of downward swinging movement of the arm 51. The stop 66 is in the form of an angle member having a flange 67 positioned in the path of swinging movement of the arm 51, and having a flange 68 secured to an embossed part 69 of the closure plate 35 by a suitable fastener element 70. The fastener element 70 extends through an elongated slot 71 formed in the embossed portion 69 to permit adjustment of the stop 66 relative to the window regulator arm 51.

It follows from the above that all of the various parts of the window regulator mechanism 46 are exclusively mounted on the closure plate 35, and may be installed on this plate before the latter is attached to the inner panel 11 of the door. It will further be noted that since the window assembly 15 is also mounted on the plate 35, the regulator mechanism 46 may be operatively connected to the vertically slidable glass panel 16 before the plate 35 is installed on the door.

In Figure 2 of the drawings, a latch assembly 72 is shown as attached to the rear end of the closure pate 35. This latch assembly may be of any desired construction, and need not be described in detail herein. In the interests of simplicity the disclosure of the latch assembly 72 is more or less limited to the latch casing which is indicated in Figure 12 by the reference character 73. In accordance with conventional practice the latch casing 73 has angularly disposed parts 74 and 75. The part 74 is removably secured at vertically spaced points to the offset flange 36 at the rear edge of the plate 35 by fastener elements 76, and the part 75 is attachable to the adjacent rear edge portion 12 of the inner panel by fastener elements 77. The arrangement is such that the latch assembly may be first attached to the closure plate 35 by the fastener elements 76, so that the latch assembly may be installed on the door as a unit with the plate 35. After the plate 35 is installed on the door, the part 75 of the latch assembly casing 73 is secured to the part 12 of the inner panel by the fastener elements 77.

In most vehicle body doors of the type disclosed herein, provision is made at the inner side of the door and at a point remote from the latch assembly 72 for operating the latter. The operating means is usually referred to in the art as a remote control, and is indicated in Figures 2, 3 and 8 by the reference numeral 78. The remote control 78 is mounted on a portion 79 of the embossment 56, and has a control shaft 80 which extends inwardly from the plate 35 so as to be conveniently operated from a position at the inner side of the door. The shaft 80 is journalled in a bracket 81, which in turn is suitably secured to the embossed portion 79 of the plate 35, and the inner end of the shaft is supported in a mounting bracket 82. The mounting bracket 82 has ears 83 which project inwardly through openings in the embossed portion 79, and are crimped over the latter. As shown particularly in Figure 8 of the drawings, an arm 84 is secured to the shaft 80 at the inner side of the embossed portion 79, and is pivoted at the free end to the front end of a link 85. As shown in Figures 3 and 5 of the drawings, the link 85 extends rearwardly along the inner side of the plate 35, and is bent laterally outwardly to project through a slot 86 formed in the closure plate 35. Thus the rear end of the link is located at the outer side of the plate 35, and is positioned for connection to the latch operating mechanism in the assembly 72. In the present instance the rear end portion of the link 85 is serrated on the inner surface, and is secured to the rear end of an extension 87 by a stud 88. The extension 87 is located at the inner side of the link 85, and is serrated to mesh with the serrations on the link 85. Also the extension 87 has an elongated slot 89 for receiving the stud, and this slot enables adjusting the extension lengthwise of the link 85. The arrangement is such as to permit varying the effective length of the link 85 to compensate for different distances between the arm 84 and the latch assembly 72. The rear end of the extension 87 is fashioned for connection to the latch bolt operating mechanism, which is not shown herein.

It follows from the above that the latch assembly 72 and the remote control 78 are also mounted on the plate 35 for installation on the inner panel 11 as a unit with the plate 35. Attention is further directed to the fact that the above construction enables assembling the remote control link 85 with the latch assembly 72 prior to installing the closure plate 35 on the inner panel 11 of the door.

The embodiment of the invention shown in Figure 13 differs from the one previously described in that the rear edge of the closure plate 35 is turned laterally outwardly to provide an integral flange 90. The flange 90 is embossed intermediate the ends to provide a part 91 which may be used as a substitute for the latch plate part 75 previously described. The portions 92 of the flange 90 form anchorage parts for the rear window guide 27 and thereby enable omitting the brackets 45 previously described.

From the foregoing it will be understood that the closure plate 35, together with all of the above described instrumentalities may be readily installed on the inner panel 11 of the door after the door structure is properly asembled on the body. In other words the plate 35 and associated instrumentalities may be produced at a point remote from the body plant, for example, and installed as an assembly on the door. This arrangement not only simplifies assembly of the door, but in addition, renders it possible to more easily repair or replace any of the instrumentalities carried by the plate 35. In any case all of the usual adjustments may be made on the bench before the plate 35 is installed on the door, so that once this plate is installed, no further adjustments are required.

The embodiment of the invention shown in Figures 14 and 15 of the drawings illustrates a door 100 having an outer panel 101 and having pillars 102 at opposite sides of the outer panel 101. The pillars 102 are angle shaped in cross section having flanges 103 forming the opposite side edges of the door and having flanges 104 turned laterally inwardly from the inner edges of the flanges 103. The outer edges of the flanges 103 are turned laterally outwardly and are suitably secured to the outer panel 101. The inner edges of the flanges 104 are offset outwardly to form recesses 105 and are turned outwardly to provide reinforcing flanges 106.

Extending between the lower end portions of the pillars 102 is a sheet 107 which forms the inner panel of the door. The opposite side edges of the sheet 107 are seated in the recessed portions 105 of the pillars, and are welded or otherwise fastened to the pillars.

The top edge of the sheet 116 terminates some considerable distance below the window opening 14 in the upper portion of the door 100 and the space between the pillars 102 above the sheet 107 is closed by a removable plate 108. The plate 108 is very similar to the plate 35 previously described in connection with Figures 1 to 13 inclusive of the drawings in that it provides a mounting for the window assembly 15, window regulator 46, latch assembly 72, and remote control 78 for the latch assembly.

The opposite edges of the plate 108 are removably attached to the adjacent flanges 104 of the pillars 102, and the bottom edge of the plate 108 is removably secured to the top edge of the sheet 107. The manner of fastening the plate 108 in the assembly may be the same as employed to secure the plate 35 in place. In any case the plate 108 also coacts with the outer panel 101 and pillars 102 to provide the well 31 for receiving the vertically slidable window of the assembly 15.

The window assembly 15, regulator mechanism 46, latch assembly 72, and remote control 78 are substantially the same in construction as the corresponding instrumentalities described in connection with the first embodiment of this invention. Accordingly the same reference numerals are used to designate corresponding parts of the above units. There is one difference, however, in the manner in which the regulator 46 and remote control 78 are mounted. As shown in Figure 14 of the drawings, the regulator mechanism 46 includes a mounting plate 109, which carries the various parts of the regulator and which is secured to the plate 108. Also instead of mounting the bracket 82 of the remote control 78 directly on the plate 108, it is fastened to a mounting plate 110 which is secured to the plate 108.

What we claim as our invention is:

1. A vehicle body door structure comprising a window panel movable in an up and down direction, inner and outer panels secured together in lateral spaced relation to provide a well for receiving the window panel, the portion of the inner panel forming one wall of the well having an opening therethrough, a plate closing the opening through the inner panel and removably secured to the inner panel, vertical guides having portions positioned within the well to respectively slidably engage opposite side edges of the window panel and secured to the plate for installation on the door structure as a unit with the plate, and a latch assembly at one edge of the door and having a casing secured to the plate for installation on the door structure as a unit with the plate and guides.

2. A vehicle body door structure comprising inner and outer panels spaced laterally from each other to provide a window receiving well therebetween, the inner panel having an opening extending downwardly from the edge of the inner panel at the top of the well, closure means for the opening including a plate removably secured to the inner panel and having the portion at the top edge coacting with an adjacent part of the outer panel to provide a window receiving slot at the top of the well, and door accessory instrumentalities supported on the plate and installed on the door structure as a unit with the plate.

3. A vehicle body door structure comprising inner and outer panels spaced laterally from each other to provide a window receiving well therebetween, the inner panel having an opening extending downwardly from the edge of the inner panel at the top of the well, closure means for the opening including a plate removably secured to the inner panel and having the portion at the top edge coacting with an adjacent part of the outer panel to provide a window receiving slot at the top of the well, and a vertical window guide extending into the well through the slot and secured to the plate for installation on the door structure as a unit with the plate.

4. A vehicle body door structure comprising a vertically slidable window, inner and outer panels spaced laterally from each other to provide a well therebetween for receiving the window, the inner panel having an opening extending downwardly from the edge of the inner panel at the top of the well, closure means for the opening including a plate removably secured to the inner panel and having the portion at the top edge coacting with an adjacent part of the outer panel to provide a window receiving slot at the top of the well, and means supporting the window on the plate.

5. A vehicle body door structure comprising inner and outer panels secured together in lateral spaced relationship and cooperating with one another to provide a window receiving well, said inner panel having an opening therethrough registering with the inner side of the well, a closure plate for the opening removably secured to the inner panel, and a window assembly mounted on the plate and installed as a unit with said plate on the door structure.

6. A vehicle body door structure comprising in combination a window assembly having a vertically slidable window, inner and outer door panels secured together in lateral spaced relationship and cooperating with one another to provide a well below the window for receiving the latter, said inner panel having an opening therethrough beneath the window assembly and opening into the well, a closure plate for the opening removably secured to the inner panel and having the top edge coacting with the adjacent portion of the outer panel to form a window ledge, and means within the well for guiding the window including vertical guides respectively slidably engageable with opposite edges of the window and mounted on the plate.

7. A vehicle body door structure comprising in combination a window assembly having a vertically slidable window, inner and outer door panels secured together in lateral spaced relationship and cooperating with one another to provide a well below the window for receiving the latter, said inner panel having an opening therethrough beneath the window assembly and opening into the well, a closure plate for the opening removably secured to the inner panel and having the top edge coacting with the adjacent portion of the outer panel to form a window ledge, and means for raising and lowering the window including regulator mechanism housed in the well and mounted on said plate.

8. A vehicle body door structure having in combination an outer panel, an inner panel secured to the outer panel in lateral spaced relation thereto and cooperating with said outer panel to provide a window receiving well, said inner panel having an opening therethrough registering with the well, a plate closing said opening and removably secured to the inner panel, a window assembly having a vertically slidable window and a regulator mechanism connected to the slidable window, said window assembly and regulator mechanism mounted on the plate and installed on the door structure as a unit with said plate.

9. A door structure comprising vertical pillars forming opposite side edges of the door, an outer panel having the opposite side edges respectively secured to the pillars at the outer sides thereof and having a part defining the bottom ledge of a window opening, an inner panel having the opposite edge portions respectively secured to the door pillars at the inner sides thereof and having the top edge spaced a substantial distance below the ledge forming part of the outer panel, a mounting plate for door accessories extending between the pillars above the inner panel having the top edge portion positioned opposite the ledge forming part of the outer panel and coacting with the latter to provide a slot for receiving a window, and means for removably securing opposite side edges of the plate to the respective pillars and for attaching the bottom edge of the plate to the adjacent top edge portion of said inner panel.

10. A vehicle body door structure comprising a window panel movable in an up and down direction, inner and outer panels secured together in lateral spaced relation to provide a well for receiving the window panel, the portion of the inner panel forming one wall of the well having an opening therethrough, a plate closing the opening through the inner panel and removably secured to the inner panel, and guides for the opposite side edges of the window panel secured to said plate and installed on the door structure as a unit with the plate.

11. The vehicle body structure defined in claim 10, having means in said well for raising and lowering the window panel including regulator mechanism carried by the plate and insertable into the well through the opening in the inner panel.

12. The vehicle body structure defined in claim 11, comprising a latch mechanism at one edge of the door structure, and a remote control device for operating the latch mechanism, said latch mechanism and remote control device being secured to the plate for installation on the door as a unit with the plate and regulator mechanism.

13. The vehicle body structure defined in claim 1, said plate having a portion embossed outwardly to form a recess, means for operating the latch assembly from the inner side of the door structure at a point remote from the latch assembly, said means comprising a remote control secured to the plate within the recess and installed on the door structure as a unit with the plate, guides and latch assembly.

14. A vehicle body door structure comprising in combination a window assembly having a vertically slidable window, inner and outer door panels secured together in laterally spaced relationship and cooperating with one another to provide a well below the window for receiving the latter, the inner panel having an opening beneath the window assembly opening into the well, said opening extending downwardly from the edge of the inner panel at the top of the well and extending substantially the full width of the inner panel, a closure plate for the opening having the marginal edge portion thereof removably secured to the inner panel, the top edge of said plate coacting with an adjacent portion of the outer panel to provide a window receiving slot at the top of the well, means within the well for guiding the window including vertical guides respectively slidably engaging opposite side edges of the window and secured to said closure plate, means for raising and lowering the window including regulator mechanism housed in the well and mounted on said plate, and a latch assembly and remote control for said latch assembly within the well and mounted on said plate for installation as a unit with said plate, regulator mechanism and vertical guides.

CARL C. FISH.
ALFRED H. HABERSTRUMP.

References Cited in the file of this patent
UNITED STATES PATENTS

| Number | Name | Date |
|---|---|---|
| 1,214,892 | Budd | Feb. 6, 1917 |
| 1,699,560 | Bourgon | Jan. 22, 1929 |
| 1,759,193 | Grimm | May 20, 1930 |
| 1,788,390 | Goldsmith et al. | Jan. 13, 1931 |
| 1,800,001 | Ackermann | Apr. 7, 1931 |
| 2,145,659 | Lane | Jan. 31, 1939 |
| 2,262,644 | Mackey | Nov. 11, 1941 |
| 2,305,399 | Adams | Dec. 15, 1942 |
| 2,582,394 | Rappl | Jan. 15, 1952 |